(12) United States Patent
Kobara et al.

(10) Patent No.: US 7,719,832 B2
(45) Date of Patent: May 18, 2010

(54) COMPUTING DEVICE MOUNTING SYSTEM

(75) Inventors: Shizunori S. Kobara, Foster City, CA (US); Paul Michael Welch, Cupertino, CA (US); George Janour, Santa Cruz, CA (US); Jacques Gagne, Los Gatos, CA (US); Guillermo Andres, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 644 days.

(21) Appl. No.: 11/555,209

(22) Filed: Oct. 31, 2006

(65) Prior Publication Data
US 2008/0099646 A1 May 1, 2008

(51) Int. Cl.
G06F 1/16 (2006.01)
(52) U.S. Cl. ............................. 361/679.58; 361/679.02; 361/679.29
(58) Field of Classification Search ............. 361/679.58
See application file for complete search history.

(56) References Cited

U.S. PATENT DOCUMENTS

| | | | | |
|---|---|---|---|---|
| 1,896,131 | A * | 2/1933 | Williams | 40/620 |
| 1,898,835 | A * | 2/1933 | Henderson | 248/311.2 |
| 5,008,487 | A * | 4/1991 | Shimmyo | 174/373 |
| 5,097,388 | A * | 3/1992 | Buist et al. | 361/679.4 |
| 5,529,265 | A * | 6/1996 | Sakurai | 244/118.5 |
| 6,149,253 | A | 11/2000 | Talasani | |
| 6,520,605 | B2 * | 2/2003 | Nunokawa et al. | 312/111 |
| 6,560,094 | B2 * | 5/2003 | Schmidt | 361/679.6 |
| 6,575,419 | B1 | 6/2003 | Masuda et al. | |
| 6,674,638 | B2 * | 1/2004 | Hsien-Chin | 361/679.27 |
| 6,842,339 | B2 * | 1/2005 | Lin et al. | 361/679.58 |
| 6,909,598 | B2 * | 6/2005 | Cheng et al. | 361/679.22 |
| 6,994,236 | B2 * | 2/2006 | Hsu | 224/275 |
| 7,180,731 | B2 * | 2/2007 | Titzler et al. | 361/679.22 |
| 7,233,486 | B2 * | 6/2007 | Kim | 361/679.29 |
| 7,317,613 | B2 * | 1/2008 | Quijano et al. | 361/679.41 |
| 7,431,615 | B2 * | 10/2008 | Ho | 439/578 |
| 7,471,511 | B2 * | 12/2008 | Montag et al. | 361/679.41 |
| 2003/0002243 | A1 * | 1/2003 | Newman et al. | 361/683 |
| 2004/0150945 | A1 * | 8/2004 | Mache et al. | 361/683 |
| 2004/0174675 | A1 * | 9/2004 | Liu | 361/687 |
| 2005/0174726 | A1 * | 8/2005 | Bang et al. | 361/681 |
| 2005/0264985 | A1 * | 12/2005 | Kim et al. | 361/681 |
| 2006/0076463 | A1 | 4/2006 | Drew | |
| 2006/0082265 | A1 | 4/2006 | Quijano | |

OTHER PUBLICATIONS

MiniHitch: Mac mini Papoose http://gizmodo.com/gadgets/gadgets/minihitch-mac-mini-papoose-172216.php, printed May 9, 2006.

* cited by examiner

*Primary Examiner*—Jayprakash N Gandhi
*Assistant Examiner*—Anthony Q Edwards

(57) ABSTRACT

A computing device mounting system is described comprising a housing defining a volume and at least one throughhole extending through the housing from a first side of the housing to a second side of the housing; and at least one fastener comprising a first connection mechanism at a first end and a second connection mechanism at a second end, wherein the first connection mechanism of the at least one fastener is arranged to protrude through the at least one throughhole and interfit with a third connection mechanism of a display and wherein the second connection mechanism of the at least one fastener is arranged to interfit with a fourth connection mechanism of a mount.

14 Claims, 6 Drawing Sheets

COMPUTING DEVICE MOUNTING SYSTEM

BACKGROUND

Interactive units, e.g., computers, set-top boxes, and/or network-connected devices, which are connected to display devices, e.g., televisions, displays, monitors, etc., are often mounted either on a stand or as a separate unit that sits on a desktop or a tabletop. This is problematic for customers wanting to mount the television onto the wall. Mounting interactive units separately can be difficult and frustrating to customers when they want to mount the televisions and interactive units onto the wall.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
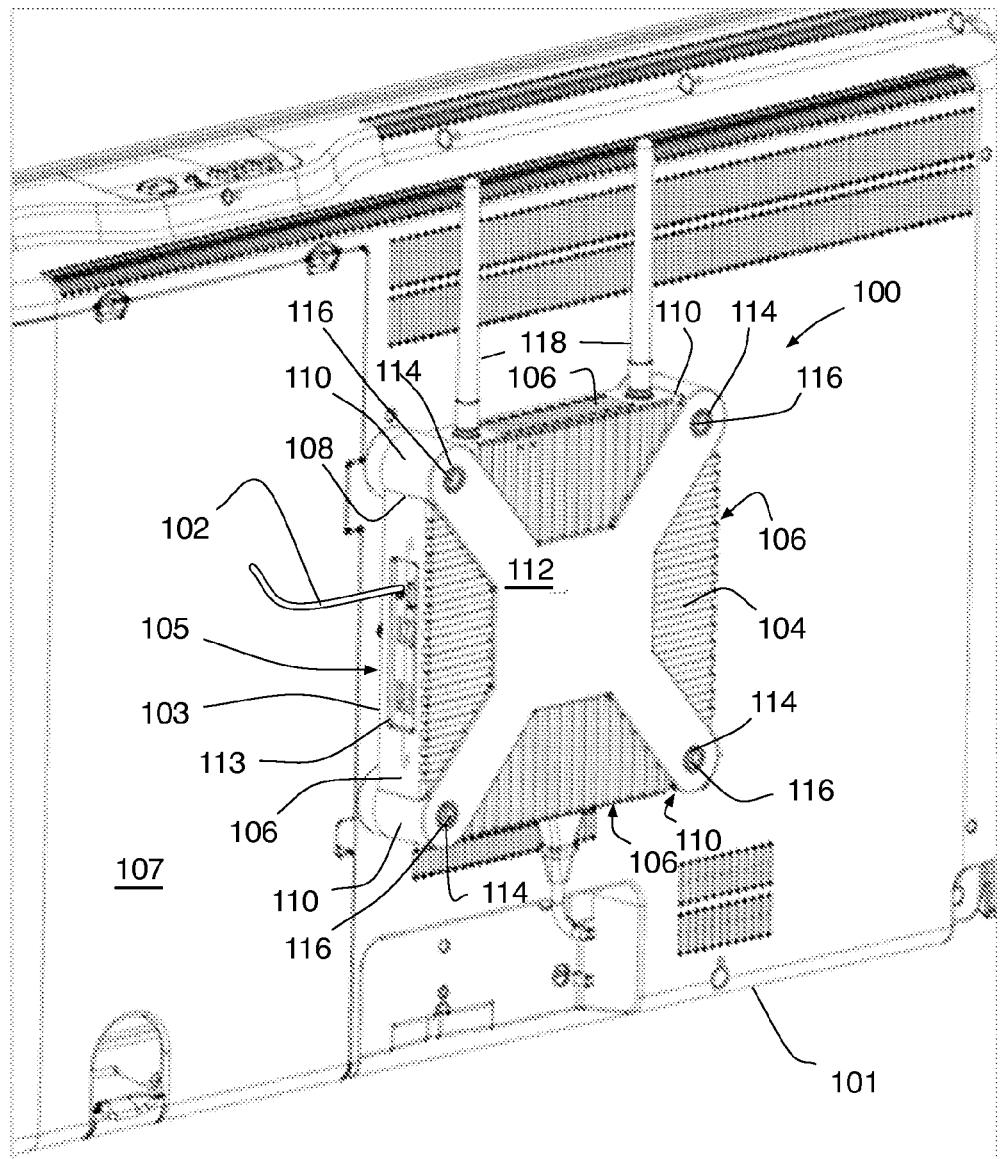
FIG. 1 is a perspective view of a computing device connected with a display device according to an embodiment.

FIG. 1 depicts a perspective view of a computing device 100, e.g., an interactive unit, mounted on a display device 101, e.g., a computer monitor, a television, etc. Computing device 100 mounted to display device 101 preserves the capability to mount the combined computing device 100 and display device 101 to a supporting object by connection to the rear of the computing device, e.g., using a display mount attached to a wall or other surface. Computing device 100 is mounted to display device 101 using a mounting capability of the display device. In at least one embodiment, a video electronics standards association (VESA) flat display mounting interface (FDMI) (also referred to as VESA mount) capability of display device 101 is used to mount computing device 100 on the display device and the computing device presents a VESA mounting capability at the rear of the computing device. That is, computing device 100 "passes through" the VESA mount capability of display device 101. Computing device 100 comprises a housing and a processor in the housing.

In some embodiments, computing device 100 provides user interaction capabilities to connected display device 101. In some embodiments, computing device 100 is further communicatively connected to display device 101 via a cable 102, e.g., an optical cable, an electrical cable, etc. In some other embodiments, computing device 100 communicatively connects wirelessly to display device 101. Computing device 100 may provide multimedia capabilities, e.g., audio, video, and photo display, and computing and/or networking capabilities, e.g., word processing, web browsing, email interactions.

Computing device 100 comprises a processing capability, e.g., via a processor or other logic device, an input mechanism, e.g., a wireless keyboard and/or mouse, and an output mechanism, e.g., audio and video ports for connection to connected display device 101.

Computing device 100 comprises a housing 103 having a rounded rectangular-shaped rear face 104 and four rectangular-shaped side walls 106 each connected to an edge of the rear face. Side walls 106 form the top, bottom, left, and right sides of housing 103. A front face 105 of housing 103 faces a rear face 107 of display device 101.

In some embodiments, rear face 104 may be a polygonal or elliptical shape. In other embodiments, more or less than four side walls 106 may be connected to rear face 104. In other embodiments, side walls 106 may be an extended shaped portion of rear face 104. In still other embodiments, side walls 106 may be polygonal-shaped and/or extend angularly away from rear face 104. In some embodiments, housing 103 is made of aluminum, e.g., die-cast aluminum.

Rear face 104 further comprises a cylindrical-shaped wall 110 at each corner of the rear face. Each cylindrical-shaped wall 110 extends in a generally perpendicular direction away from rear face 104 and generally parallel to side walls 106. Opposite edges 108 (for simplicity a single edge 108 is shown) of each side wall 106 connect to a corresponding cylindrical-shaped wall 110. Rear face 104 in combination with side walls 106 and cylindrical-shaped walls 110 together form an open-ended box shape, e.g., an open-ended parallelepiped shape, for retaining the computing device capabilities and provide a structural configuration for mounting attached display device 101 to a supporting object, e.g., a vertical surface such as a wall having a mount, a display stand, etc.

In other embodiments, walls 110 may be polygonal-shaped or elliptical-shaped and/or extend angularly away from rear face 104 at other than a perpendicular angle. In some embodiments, cylindrical-shaped walls 110 may be formed as a continuous part of housing 103.

At least one side wall 106 further comprises a surface at an angle to the face of side wall 106 to define an opening 113 for connectors, such as power, and input and output connection ports. In some embodiments, defined openings 113 for connectors may be consolidated to a single side wall 106. In other embodiments, each side wall 106 comprises a defined opening 113.

An X-shaped section 112 of rear face 104 connects a rearward portion of cylindrical-shaped walls 110 at the four corners of the rear face together. In some embodiments, X-shaped section 112 may be formed as a raised portion of rear face 104. In some embodiments, X-shaped section 112 may be a depression formed in rear face 104. X-shaped section 112 may provide a flat region for a mounting device to contact computing device 100 during mounting of a connected computing device 100 and display device 101 to a supporting object.

Housing 103 further comprises four defined throughholes 114 extending through the housing from rear face 104 and axially through cylindrical wall 110 to a front-ward portion of the housing. Throughholes 114 are each cylindrical-shaped and axially aligned with a centerline of the cylindrical walls 110 and defined by an interior face at an angle to rear face 104. In still other embodiments, housing 103 comprises fewer or greater numbers of throughholes 114.

Each throughhole 114 receives a fastener 116 comprising a first end for connecting computing device 100 to display device 101. Fastener 116 also comprises a second end which, with a fastener 116 inserted in a throughhole 114, is exposed to the exterior of housing 103 for connecting computing device 100 to a supporting object. After fastener 116 attaches computing device 100 to display device 101, the attached computing and display devices are connected to a supporting object with the second end of the fastener. A computing device mounting system comprises a computing device housing 103 and at least one fastener 116.

Figure 2:
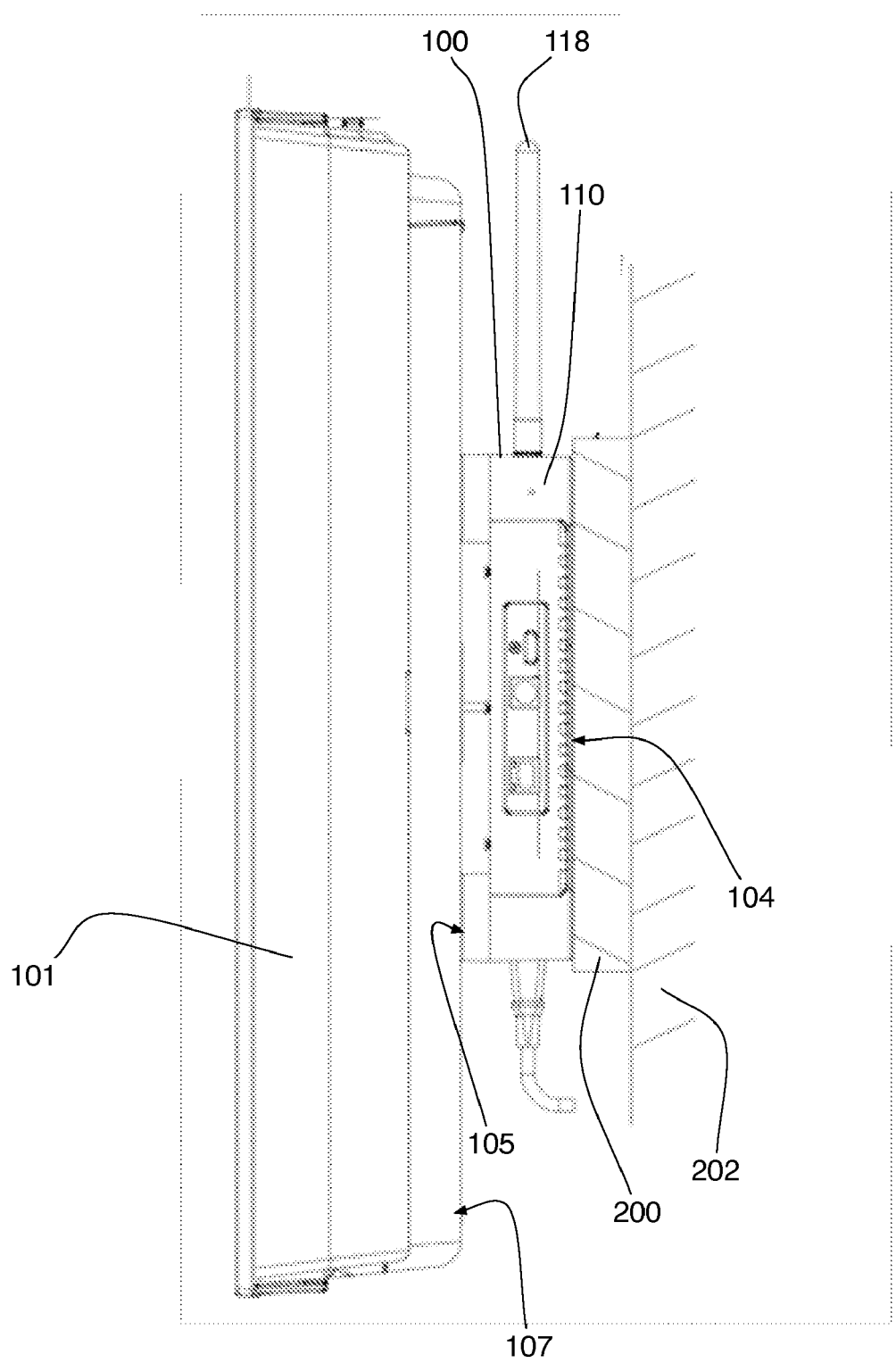
FIG. 2 is a side view of a computing device connecting a display device and a mount of a supporting object according to an embodiment.

FIG. 2 depicts a side view of computing device 100 mounted on display device 101 and connected to a mount 200 connected to a supporting object 202, e.g., a wall. Specifically, front face 105 of computing device 100 faces rear face 107 of display device 101 and rear face 104 faces mount 200 which is, in turn, connected to supporting object 202. Computing device 100 is positioned between display device 101 and mount 200 connected to supporting object 202. In some embodiments, mount 200 may be a mounting bracket or arm, a VESA mount, etc. and supporting object 202 may be a wall, a stand, a desk, etc. Mount 200 may be permanently or temporarily connected to supporting object 202 and computing device 100. In some embodiments, computing device 100 connects directly with supporting object 202.

Figure 3:
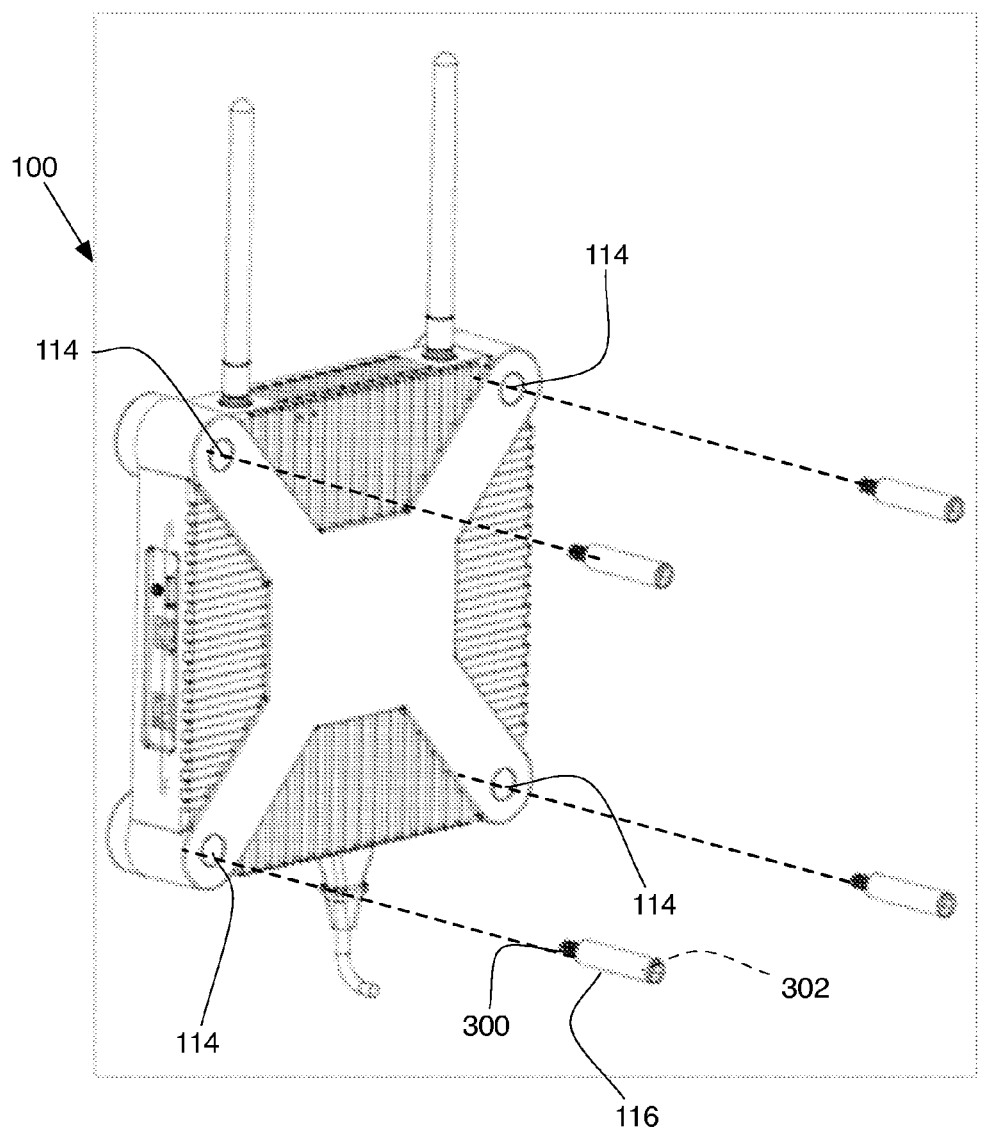
FIG. 3 is an exploded perspective view of a computing device and fasteners according to an embodiment.

FIG. 3 depicts an exploded perspective view of computing device 100 and four fasteners 116 each aligned with a respective centerline of four defined throughholes 114. Each fastener 116 comprises a first end 300 for connecting computing device 100 to display device 101 and a second end 302 for connecting the computing device to mount 200.

After insertion of fastener 116 into throughhole 114, at least a portion of first end 300 extends beyond front face 105 of computing device 100. In at least some embodiments, the four fasteners 116 and the four throughholes 114 are aligned parallel to each other.

Figure 4A:
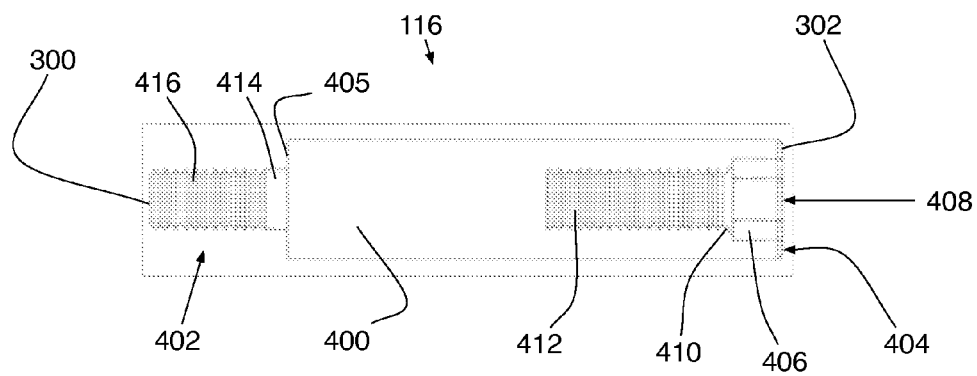
FIG. 4A is a side sectional view of a fastener according to an embodiment.

FIG. 4A depicts a side sectional view of fastener 116 according to an embodiment. Fastener 116 comprises a first cylindrical-shaped portion 400 and a second cylindrical-shaped portion 402. As depicted, second portion 402 is smaller in diameter than first portion 400.

Figure 4B:
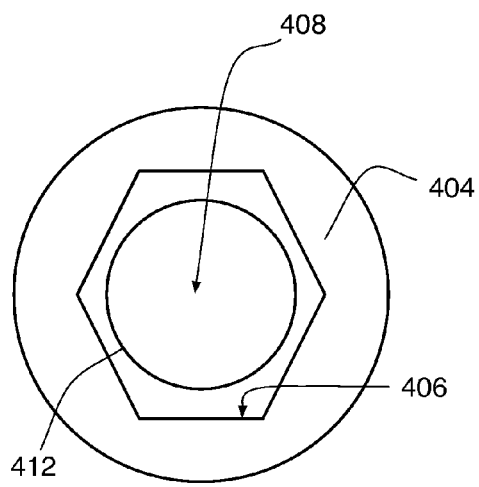
FIG. 4B is an end view of the fastener of FIG. 4A.

First portion 400 comprises second end 302 comprising a mechanism for connection to mount 200. First portion 400 comprises a first end face 404 at second end 302 of fastener 116 and a shoulder 405 adjacent second portion 402. A first inner surface 406 connects with first end face 404 and extends inwardly at an angle from the first end face and defines a fastener opening 408 for receiving a fastener. First inner surface 406 forms a hexagonal-shaped portion (FIG. 4B) of fastener opening 408 in second end 302. A second inner surface 410 extends at an angle from first inner surface 406 and further defines fastener opening 408.

Figure 4C:
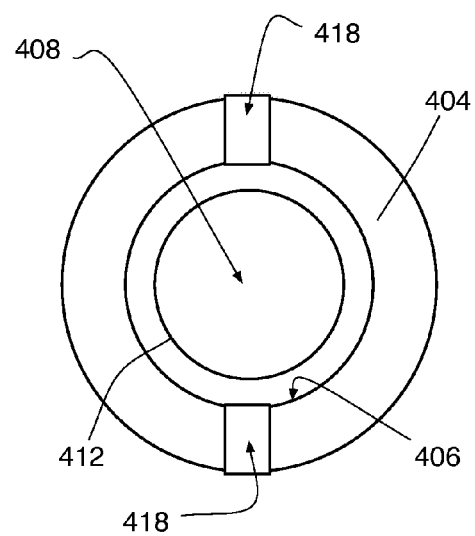
FIG. 4C is an end view of the fastener of FIG. 4A according to another embodiment.

In some embodiments, first inner surface 406 forms a polygonal-shaped portion of fastener opening 408. In at least one embodiment, first inner surface 406 forms a circular-shaped portion (FIG. 4C) comprising a notch 418 bisecting first end face 404 for receiving a bladed screwdriver end.

An inner threaded region 412 extends axially from second inner surface 410 toward first end 300. Inner threaded region 412 is threaded to receive a threaded connection mechanism from supporting object 202, e.g., a bolt or other threaded device from mount 200 connected to the supporting object, or from mount 200.

In some embodiments, inner threaded region 412 connects directly with first inner surface 406. In at least one embodiment, inner threaded region 412 corresponds to a VESA mount threading, i.e., with fastener 116 attached to display device 101 by first end 300, threaded region 412 extends an existing VESA mount capability of display device 101.

Second portion 402 connects to first portion 400 at shoulder 405 and extends axially away from second end 302. Second portion 402 comprises a neck 414 connected to first portion 400 at shoulder 405 and an outer threaded portion 416 connected to the neck. Outer threaded portion 416 is threaded to mate with a correspondingly situated threaded receptacle of display device 101. In some embodiments, outer threaded portion 416 connects directly with shoulder 405 without neck 414.

Figure 5:
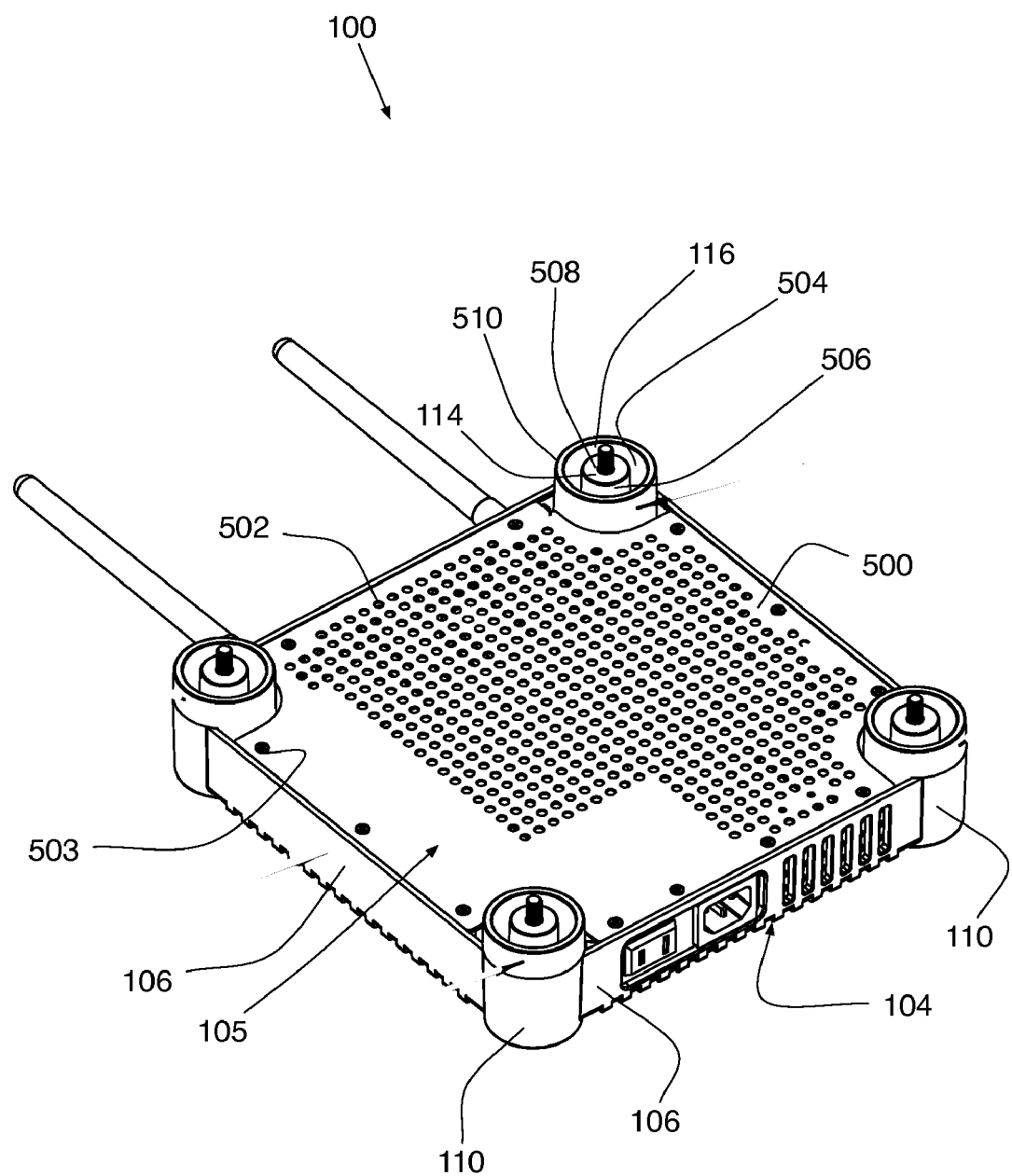
FIG. 5 is another perspective view of a computing device according to an embodiment.

FIG. 5 depicts another perspective view of computing device 100, i.e., a portion comprising front face 105 of housing 103 opposite from rear face 104. Housing 103 comprises a cover 500 extending across the lower open portion of the housing and extending adjacent side walls 106 and shaped walls 110. Cover 500 provides a cover for components within housing 103 interior. In some embodiments, cover 500 comprises two or more pieces. In some further embodiments, cover 500 is solid without vent openings.

A retaining mechanism 503, e.g., a screw, a bolt, a rivet, etc., retains cover 500 in place on lower portion of housing 103. A plurality of retaining mechanisms 503 (for simplicity, a single retaining mechanism is identified) are positioned adjacent the periphery of cover 500. In some embodiments, a single retaining mechanism 503 may retain cover 500 in place. In at least some embodiments, cover 500 is formed as an integrated portion of housing 103. In some embodiments, cover 500 is permanently connected with side walls 106 and/or cylindrical-shaped walls 110, e.g., by welding, joining, or other connection mechanisms.

As depicted in FIG. 5, cylindrical-shaped wall 110 comprises an inner wall 504 and a second cylindrical-shaped wall 506 axially aligned with the cylindrical-shaped wall Second cylindrical-shaped wall 506 comprises a face 508 at the end distal from rear face 104 and at least even with a front edge 510 of cylindrical-shaped wall 110. With fastener 116 attached to display device 101, face 508 and/or front edge 510 may contact rear face 107 of the display device.

In some embodiments, face 508 extends radially outward to front edge 510 and inner wall 504 forms the inner portion of second cylindrical-shaped wall 506.

FIG. 5 depicts second end 300 of fastener 116 extending through throughhole 114 and beyond face 508. Second end 300 of fastener 116 comprises a connection mechanism, e.g., a threaded region, for connecting with a correspondingly situated connection mechanism, e.g., a corresponding threaded receiver, of display device 101.

Figure 6:
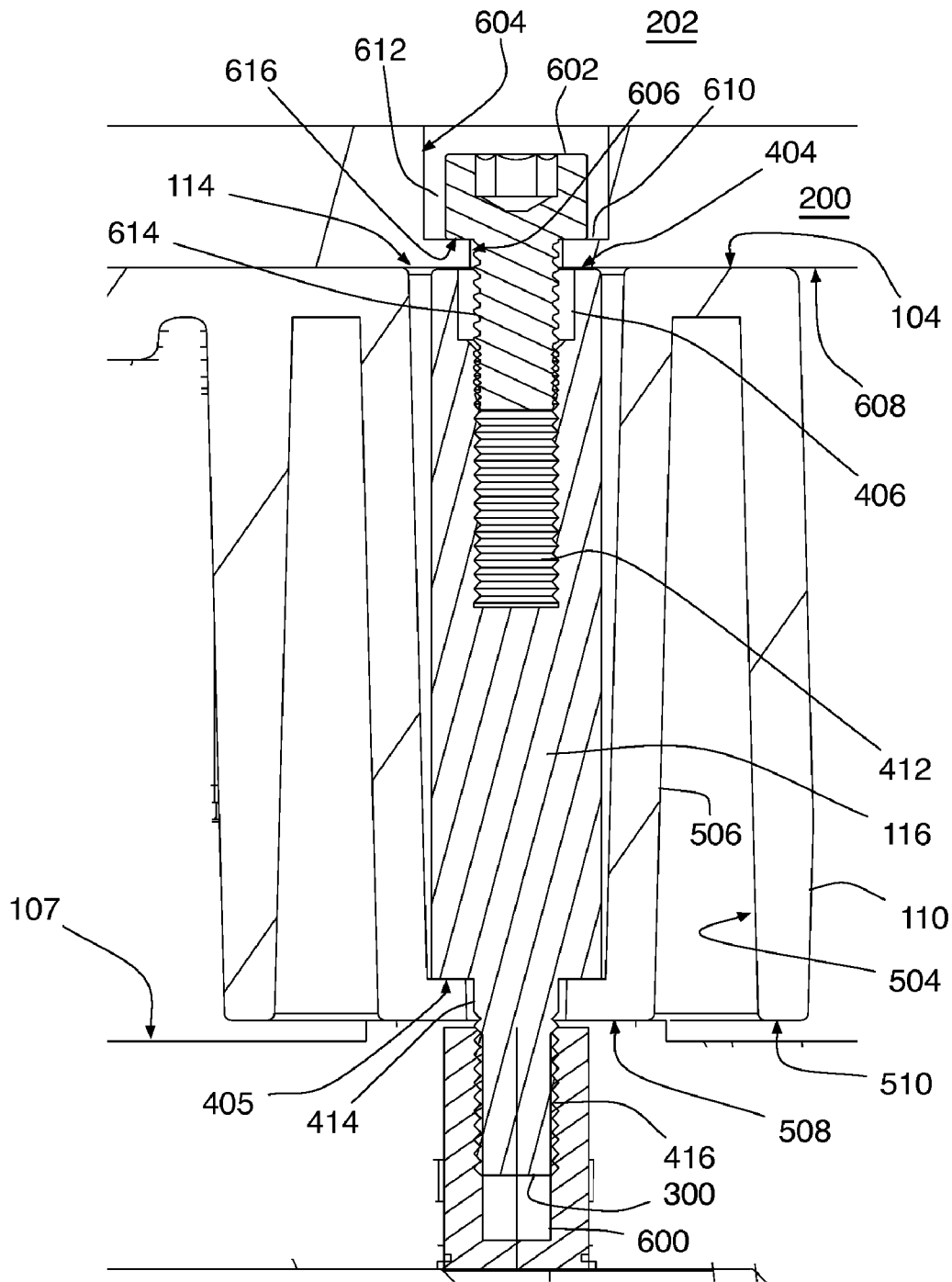
FIG. 6 is a portion of a sectional side view according to an embodiment.

FIG. 6 depicts a portion of a sectional side view of the FIG. 2 connection of display device 101, computing device 100, and mount 200 taken through an axial portion of a cylindrical-shaped wall 110. Fastener 116 is inserted into throughhole 114 and a portion of outer threaded portion 416 extends through face 508 of second cylindrical-shaped wall 506 and into a threaded connection 600 in rear face 107 of display device 101. Front face 105 of housing 103 contacts rear face 107 at at least face 508 of second cylindrical-shaped wall 506. In some embodiments, front edge 510 of cylindrical-shaped wall 110 contacts a portion of rear face 107.

With fastener 116 fully inserted into throughhole 114, shoulder 405 of the fastener contacts an inner surface of face 508 of second cylindrical-shaped wall 506. Collar 414 of fastener 116 extends through the defined opening in face 508. Movement of outer threaded portion 416 into threaded connection 600 causes shoulder 405 to urge the inner surface of face 508 toward display device 101 and thereby urge face 508 into contact with rear face 107 of the display device.

With fastener 116 fully inserted into throughhole 114, second end 302 of the fastener receives a threaded fastener 602, e.g., a threaded bolt, into opening 408 and into cooperation with inner threaded region 412 to connect mount 200 to computing device 100. Mount 200, in turn, is connected to supporting object 202. In some embodiments, threaded fastener 602 connects supporting object 202 directly to computing device 100.

As depicted, mount 200 comprises a first inner wall 604 adjacent a rear face of the mount and defining an opening to receive threaded fastener 602. Mount 200 further comprises a second inner wall 606 adjacent first inner wall 604 and front face 608 of the mount and defining a second opening. Second inner wall 606 forms a smaller diameter opening than first inner wall 604. An inner face 610, parallel with front face 608 of mount 200, connects first inner wall 604 and second inner wall 606.

Threaded fastener 602 comprises a head portion 612 connected with a threaded portion 614. Head portion 612 comprises a shoulder 616 at the connection of the head portion and threaded portion 614 and extending away from threaded portion 614. As threaded fastener 602 is inserted through the first and second openings of mount 200 and into cooperation with threaded region 412, shoulder 616 contacts inner face 610 and urges the inner face toward computing device 100 and thereby urges front face 608 of the mount into contact with rear face 104 of the computing device. In some embodiments, threaded fastener 602 may be a screw, bolt, or other connection mechanism.

What is claimed is:

1. A computing device mounting system, comprising:
a housing defining a volume and at least one throughhole extending through the housing from a first side of the housing to a second side of the housing; and
at least one fastener comprising a first connection mechanism at a first end and a second connection mechanism at a second end,
wherein the first connection mechanism of the at least one fastener is arranged to protrude through the at least one throughhole and interfit with a third connection mechanism of a display and wherein the second connection mechanism of the at least one fastener is arranged to interfit with a fourth connection mechanism of a mount, wherein the at least one fastener comprises a stepped portion adjacent the first connection mechanism;
wherein the wall of the housing comprises a first portion defining a first interior volume and a second portion defining a second interior volume greater than the first interior volume; and
wherein the stepped portion of the fastener is arranged to contact the first portion of the wall.

2. A computing device mounting system according to claim 1, wherein a wall of the housing extends from the first side of the housing to the second side of the housing to define the at least one throughhole.

3. A computing device mounting system according to claim 2, wherein the at least one fastener is arranged to contact the wall of the housing to connect the computing device housing to the display.

4. A computing device mounting system according to claim 1, wherein the first connection mechanism comprises an external thread and the second connection mechanism comprises an internal thread, wherein the at least one fastener comprises a fastener including the first connection mechanism and the second connection mechanism and wherein the first connection mechanism and the second connection mechanism are integrally formed as a single unitary body and are permanently joined to the fastener.

5. A computing device mounting system according to claim 1, wherein the housing defines four throughholes spaced from each other in accordance with a VESA mounting standard.

6. A computing device mounting system according to claim 1, comprising:
a computing device positioned in the volume of the housing and connectable with the display.

7. A display and attached computing device mounting system, comprising:
a display comprising a first connection mechanism; and
a computing device mounting system attached to the display using at least one fastener, wherein the computing device mounting system comprises:
a housing defining a volume and at least one throughhole extending through the housing from a first side of the housing to a second side of the housing, the housing having a first stepped portion along the throughhole; and
at least one fastener comprising a second connection mechanism at a first end and a third connection mechanism at a second end,
wherein the second connection mechanism of the at least one fastener is arranged to protrude through the at least one throughhole and interfit with the first connection mechanism of the display and wherein the third connection mechanism of the at least one fastener is arranged to interfit with a fourth connection mechanism of a mount, wherein the second connection mechanism comprises an external thread and the third connection mechanism comprises an internal thread, wherein the at least one fastener includes a second stepped portion in contact with the first stepped portion proximate the second connection mechanism and the first connection mechanism of the display and distant the third connection mechanism.

8. A display and attached computing device mounting system according to claim 7, wherein the first connection mechanism comprises four threaded openings spaced from each other in accordance with a VESA mounting standard.

9. A display and attached computing device mounting system according to claim 7, wherein the computing device mounting system comprises an electronic device and communicates signals to the display.

10. A computing device mounting system for mounting a display to a mount, comprising:
a housing comprising:
a first face arranged to be adjacent a display;
and a first stepped portion proximate the first face
a second face arranged to be adjacent a mount; and
a fastener intersecting at least the first face and arranged to connect the display and the mount, the fastener having a first threaded connection mechanism at a first end of the fastener and a second threaded connection mechanism at a second end of the fastener, wherein the first threaded connection mechanism and the second threaded connection mechanism are integrally formed as a single unitary body and are permanently joined to the fastener, wherein the fastener extends through the housing and includes a second stepped portion in contact with the first stepped portion proximate the first face of the housing and distant the second face of the housing.

11. A computing device mounting system according to claim 10, wherein each of the first threaded connection mechanism and the second threaded connection mechanism comprises one of an internal thread and an external thread.

12. A computing device mounting system according to claim 10, wherein the fastener is concurrently connectable with both the display and the mount.

13. A computing device mounting system according to claim 10, the housing further comprising:
a computing device connectable with the display.

14. The computing device mounting system of claim 1 further comprising a computing device within the housing.

* * * * *